(12) United States Patent
Fitzpatrick et al.

(10) Patent No.: US 7,035,859 B2
(45) Date of Patent: Apr. 25, 2006

(54) METHOD AND SYSTEM FOR INTRA-TABLE REFERENTIAL INTEGRITY FOR RELATIONAL DATABASE SYSTEMS

(75) Inventors: Gregory P. Fitzpatrick, Keller, TX (US); Jeffrey A. Heming, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 09/924,823

(22) Filed: Aug. 8, 2001

(65) Prior Publication Data

US 2003/0037024 A1  Feb. 20, 2003

(51) Int. Cl.
G06F 17/30   (2006.01)

(52) U.S. Cl. ............................... 707/100; 707/2; 707/3; 707/9; 707/10; 707/201; 707/203

(58) Field of Classification Search ............... 707/1, 707/2, 3, 9, 10, 100, 102, 104.1, 203, 201, 707/4, 7, 101, 103 R, 204; 702/62; 705/5, 705/7, 20, 27, 30, 400; 714/4; 709/101, 102, 709/106, 201, 203, 220, 225, 207, 217, 219, 709/206, 227, 231, 236
See application file for complete search history.

(56) References Cited

U.S. PATENT DOCUMENTS 5,499,359 A * 3/1996 Vijaykumar ................ 707/201
5,745,896 A * 4/1998 Vijaykumar ................ 707/100
5,787,442 A * 7/1998 Hacherl et al. ............. 707/201
5,832,451 A * 11/1998 Flake et al. ..................... 705/5
5,842,212 A * 11/1998 Ballurio et al. ............. 707/100
5,978,770 A * 11/1999 Waytena et al. ................ 705/5
6,073,140 A * 6/2000 Morgan et al. ............. 707/203
6,154,847 A * 11/2000 Schofield et al. ............. 714/4

FOREIGN PATENT DOCUMENTS

EP      360387    *   3/1990

OTHER PUBLICATIONS

Robert et al., Automation integrity: OS/2 EE Database Manager automatically enforces referential intergrity, Jun. 1991 DBMS v4.*

Turker et al., Semantic intergrity support in SQL: 1999 and commercial (object) relational database management system, Jun. 2001.*

* cited by examiner

*Primary Examiner*—Shahid Alam
*Assistant Examiner*—Fred I. Ehichioya
(74) *Attorney, Agent, or Firm*—Akerman Senterfitt

(57) ABSTRACT

In a relational database management system (RDBMS), a method of processing related records can include receiving a plurality of related records and inserting the plurality of related records into a single table of an RDBMS. The plurality of related records can be associated as a set within the single table using a published function of the RDBMS. Responsive to a triggering condition, particular related records of the set can be selectively purged from the single table.

16 Claims, 5 Drawing Sheets

METHOD AND SYSTEM FOR INTRA-TABLE REFERENTIAL INTEGRITY FOR RELATIONAL DATABASE SYSTEMS

BACKGROUND OF THE INVENTION

1. Technical Field

This invention relates generally to relational database management systems, and more particularly, to extending the functionality of a relational database management system.

2. Description of the Related Art

A relational database management system (RDBMS) is a computer system which stores related information in a manner that facilitates the searching and modifying of that information. In a sense, an RDBMS is a high level programming language that specializes in data manipulation. An RDBMS accomplishes these modifications through a series of commands, functions, and rules. Application programmers can utilize these functions from within application code when constructing programs for end users. Using an RDBMS to manage data, application programmers can write more stable and efficient code.

Applications which interoperate with RDBMS systems often incorporate a customized "front end" and a standardized "back end." The "front end" can include a graphical user interface (GUI), tailored reports, and application specific code. The "back end" can include the RDBMS. A database "back end" grants an application substantial, standardized functionality. Database "back ends" allow multiple users to simultaneously access and modify common data without corruption of the data. Additionally, database "back ends" can implement various security-related privilege schemes for different application users. Database "back ends" also allow efficient searches through large amounts of records located with different database tables.

An RDBMS requires significant structure and form to carry out its intended functions. An RDBMS structures information as a collection of tables having inter-related columns and rows. To access information stored in a relational database, an RDBMS provides a query methodology that allows database administrators and application programmers to access and manipulate stored information. One such query methodology is the Structured Query Language (SQL) interface, which is specified by standards adopted by the American National Standards Institute (ANSI) and the International Standards Organization (ISO) following original development work by International Business Machines (IBM) Corporation of Armonk, N.Y. The SQL interface permits users to perform operations on data tables. Operations can be performed interactively through batch file processing, or through SQL functions embedded in code of host languages such as C, COBOL, Pascal, and the like.

Certain database applications temporarily append nearly identical records knowing only one such record will be ultimately stored in the database. An airline passenger reservation system is an example of such an application. In an airline passenger reservation system, a passenger can make multiple reservations for different flights originating in a departure city and arriving at a destination city. Notwithstanding, the passenger likely plans on confirming and traveling on one of the reserved flights. Still, at the time the passenger reserves the multiple flights, there is uncertainty as to which reservation will be confirmed. Each of these reservations, however, can be stored as a temporary record in a row of a database table.

Presently, the front-end systems or application programs which interact with RDBMSs facilitate and track the grouping of related rows within a single database table. Hence, the application programs must contain code that maintains relationships among records within a single database table when such relationships are needed. Generating code within every database application that needs this commonly occurring functionality can be inefficient and wasteful.

SUMMARY OF THE INVENTION

The invention disclosed herein provides a method and apparatus which can associate related records within a single table of a relational database management system (RDBMS). The associated records typically are temporary records which can be purged at a later time. Using the invention disclosed herein, the related records can be identified within the table of the RDBMS and manipulated as a set as a function of the RDBMS rather than as the result of application programming.

One aspect of the present invention can include a method of processing related records in an RDBMS. The method can include receiving a plurality of related records and inserting the plurality of related records into a single table of the RDBMS. The plurality of related documents can be associated as a set within the single table using a published function of the RDBMS. For example, the table can include a data type for specifying the plurality of related records and the associating step can include assigning to each one of the plurality of related records a common identifier conforming with the data type. Notably, the common identifier can be unique to the set. Responsive to a triggering condition, particular related records of the set can be selectively purged from the single table. The triggering condition can identify at least one of the plurality of related records. In that case, the purging step can purge non-identified related records of the set. Alternatively, the purging step can purge each one of the plurality of related records.

The method further can include disassociating selected records from the set responsive to a triggering condition and deleting throughout the RDBMS, records linked to the purged records. This can be performed using referential integrity rules. Additionally, the method can include associating selected records of the set as a subset. In that case, the particular related records of the purging step can include at least one selected record of the subset.

Another embodiment of the invention can include a method of processing related records in an RDBMS. The method can include receiving a plurality of related records and inserting the plurality of related records into a single table of an RDBMS. The plurality of related records can be associated as a set within the single table. Each one of the plurality of related records can be assigned a common identifier unique to the set. The common identifier can conform to a data type in the table for associating the plurality of related records. Responsive to a triggering condition, at least one of the plurality of related records can be identified. Particular non-identified related records of the set selectively can be purged.

Another aspect of the invention can include an RDBMS having a table for storing a plurality of records. The table can be configured with an identifier such as a data type for specifying related ones of the plurality of records as a record set. The identifier can be unique to each record set. An associate record set processor can be included for associating the related ones of the plurality of records with one another as a record set within the table. A purge record set processor can be included for purging selected ones of the record set in the table responsive to a triggering condition. Notably, records existing throughout the RDBMS which are linked to the purged records also can be purged. A second pre-defined table within the RDBMS can be included for maintaining associations of the related ones of the plurality of records within the table. A disassociate record set processor can be included for disassociating selected records of the record set responsive to a triggering condition.

Another embodiment of the invention can include an RDBMS including a table for storing a plurality of records wherein particular ones of the plurality of records are related. The RDBMS can include an associate record set processor for associating the related ones of the plurality of records with one another as a record set within the table and a purge record set processor for purging selected ones of the record set in the table responsive to a triggering condition. A second pre-defined table within the RDBMS can be included for maintaining associations of the related ones of the plurality of records within the table as the record set. The pre-defined table can include an identifier such as a data type for specifying related ones of the plurality of records. Further, the RDBMS can include a disassociate record set processor for disassociating selected records of the record set responsive to a triggering condition. Notably, the purge record set function can delete records linked to the purged records throughout the RDBMS.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE DRAWINGS

The invention disclosed herein provides a method and apparatus for adding functionality to a relational database management system (RDBMS). In particular, the invention enables an RDBMS to group related records within a single table of a database. Typically, these records are one or more temporary records within the database which can be purged at a later time. Using the invention disclosed herein, the related records can be identified within the table and manipulated as a set. For example, particular ones of the related records can be purged in addition to any other linked records within the RDBMS. The set can be processed responsive to a triggering event which can be received from another application program such as a front-end program to the RDBMS. Accordingly, when such a trigger event occurs, "n" records or rows of a set in the table can be updated using a single function of the RDBMS, rather than the "front-end" initiating "n" calls to update "n" rows of the table.

In illustration, airline passengers often make multiple alternate airline reservations for a single trip to accommodate for different scheduling contingencies. Although the passenger will ultimately confirm a single reservation, the reservation management system must track each contingent reservation until such time when the passenger identifies an intended flight. The records typically are stored within a single database. In conventional systems, the related records are tracked using business logic included within the front-end or another application program. When a particular reservation is identified as the intended reservation, for example, when the reservation is confirmed or the passenger boards a flight, the other unused and related reservations can be purged from the system. Within conventional systems, the front-end system, having tracked each unused and related record, can purge each of those records from the RDBMS. According to the present invention, this functionality can be incorporated within the RDBMS rather than another application program. Hence, the confirmed reservation can remain in the database table, while contingent reservations can be purged from the database.

Figure 1:
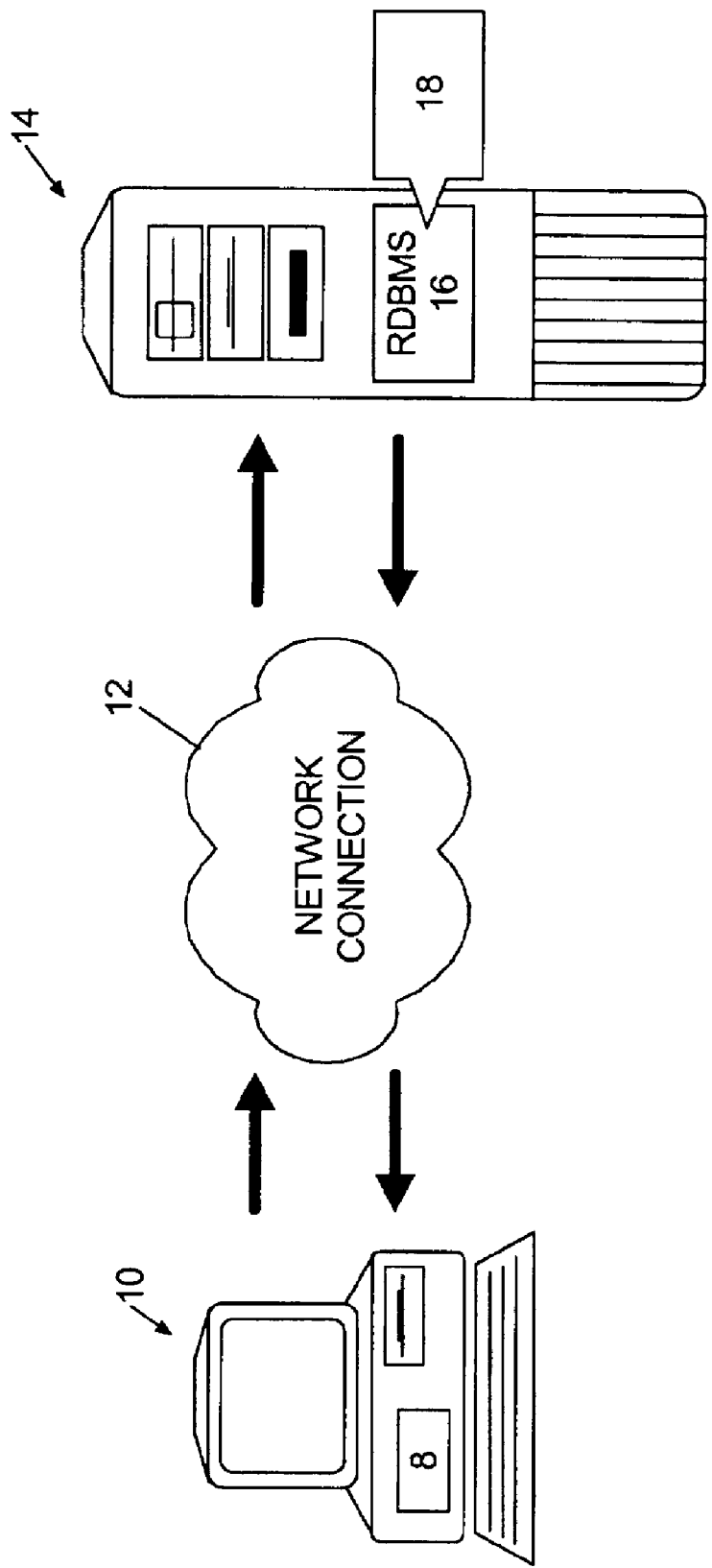
FIG. 1 is a schematic representation of an exemplary system for processing related intra-table records.

FIG. 1 is a pictorial representation of an exemplary system for processing related intra-table records. As shown in FIG. 1, the system can include a database server 14 and a database client 10. The database server 14 can include an RDBMS 16 having an intra-table record set processor 18. The database client 10 can include a database application 8.

The database server 14 and the database client 10 can be communicatively linked through a network connection 12. For example, the network connection 12 can be the Internet where communication can be facilitated using TCP/IP, HTTP, and FTP protocols. Alternatively, communication can be facilitated though direct network access, a local area network, a wide area network, an integrated service digital network (ISDN) connection, or a series of direct dial up connections initiated by the client and server systems 10 and 14 respectively. Still, communication can be facilitated via a direct connection or a wireless communications network. In any case, those skilled in the art will recognize that any suitable method of connecting computers in a computer communications network as well as any suitable network protocol can be employed.

Figure 2:
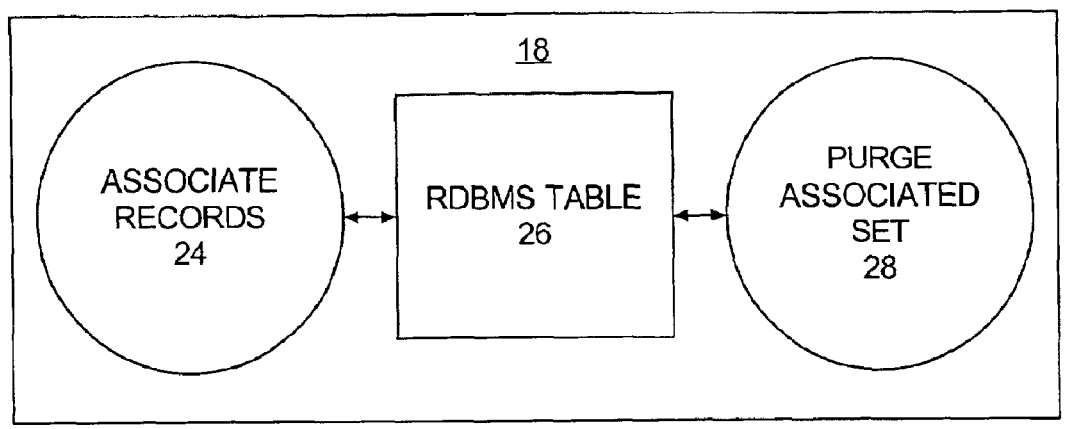
FIG. 2 is a schematic diagram illustrating an exemplary intractable record set processor.

FIG. 2 is a schematic diagram illustrating an embodiment of the intractable record set processor 18 of FIG. 1. The intractable record set processor 18 can include an associate records function 24, a purge associated set function 28, and an RDBMS table 26. The associate records function 24 can associate one or more received related records into a record set. In doing so, the associate records function 24 further can assign a common identifier to each of the related records of a set. Notably, though the identifier is common among members of a set, the identifier can be unique in relation to identifiers of other sets. Another function of the associate records function 24 is to disassociate one or more records from a record set. For example, the common identifier can be removed from one or more records to be disassociated from a specified set.

The purge associated set function 28 can purge one or more records of a set as well as an entire set of records. In particular, when one or more records have been selected or confirmed, the unconfirmed or "non-selected" members of the record set can be purged. It should be appreciated that any linked records existing within the database also can be deleted after purging the non-selected records. Notably, once records of a particular set have been purged, the unique identifier corresponding to the set is no longer needed and can be deleted or released for reassignment to another set. Taking the previous airline example, once a passenger has confirmed a particular reservation, the contingent reservations can be deleted. Accordingly, as the set contains only a single reservation, the unique identifier is no longer required.

The associate records function 24 and purge associated set function 28 can be published by the RDBMS 16 to assure access. Accordingly, database administrators, application programmers, database users, as well as other computer applications such as a database application program or "front-end" system can be provided with access to the functions. Those skilled in the art will recognize that access can be provided through a variety of mechanisms and the invention is not so limited to a particular embodiment. For example, access can be provided via an RDBMS query language, procedures within the RDBMS, batch file processing, and/or database application code.

The RDBMS table 26 can be configured using a variety of mechanisms. In one embodiment, the RDBMS table 26 can be configured to include a new data type which can be referred to as "common". The common data type can be specified as any of a variety of data types such that a unique identifier can be designated. For example, the common data type can be defined as text, an integer, or another suitable data type. In one embodiment, a column can be added to RDBMS table 26 which can store an identifier for associating intractable related records. Accordingly, the related records can be inserted into RDBMS table 26. The associate records function 24 can perform such updates as well as assign the identifier which can be shared by each related record of a set, but can be unique with respect to other record sets. In this manner intractable related records can be identified. Thus, as shown below, related records 1, 2, and 3, have been associated as members of a set and assigned an identifier of "SET_01" for the common data type.

| record_id | common |
|---|---|
| Record_1 | SET_01 |
| Record_2 | SET_01 |
| Record_3 | SET_01 |
| Record_4 | SET_02 |
| Record_5 | SET_02 |

The associate records function 24 can ensure that the value of the "common" data type is consistent for members of a set and unique with respect to other sets. Accordingly, Records 1, 2, and 3, as members of a set, have an common data type value of "SET_01". Records 4 and 5, as members of another set, have a common data type value of "SET_02". As mentioned, once a particular value is associated to a particular record set, such as "SET_01", no other record set can be assigned the same value.

The purge associated set function 28 can use the value contained in the common data type field to delete selected records within an associated set of records. For example, if one or more particular records of "SET_01" are selected, the purge associated record set function 28 can purge any non-selected records of that set. Notably, if no members are selected, for example, within a predetermined time period, then all members of a set can be purged. It should be appreciated that the purge associated record set function 28 can be implemented to purge all records within a set including the selected record. In such an implementation, to prevent a selected record from being purged, that record would necessarily be disassociated from the related set before implementing the purge record set function 28.

Those skilled in the art will recognize that the invention is not so limited to using a particular mechanism for identifying intra-table record associations. Accordingly, any suitable method for associating related records within a single table can be used. For example, a multidimensional array internal to the RDBMS can maintain intra-table record associations. In that case, one dimension of the array can indicate a unique associated set, while another dimension of the array can detail the records contained within the set. To illustrate, an array (ARRAY[X][Y]), can contain entries ARRAY[3][Record1], ARRAY[3][Record2], ARRAY[3][Record3] for associating Records1, 2, and 3 as an associated set. Likewise ARRAY[5][Record4], ARRAY[5][Record5] can associate Records 4 and 5 into an associated set. Other embodiments of the invention can incorporate maintenance tables, embedded code within the RDBMS itself, or various combinations of embedded code, a common data type, or internal RDBMS tables to specify related records.

No matter which mechanism is used for identifying intractable record associations, the system can record intractable record associations within a pre-defined RDBMS table. Such a table can be used by database administrators and developers to resolve problems within databases. This table can include such entries as an association identifier, a database identifier, a table identifier, a record identifier, an operation type which can include association and purge operations, a date of operation, and a user_id for a given user that performed an operation. One skilled in the art will recognize this pre-defined RDBMS table for recording intractable record associations is analogous to other pre-defined RDBMS tables used for admistrative purposes, such as ALL_TABLESPACES, ALL_PRIVS, and USER_LOCAL_PRIVS.

Figure 3:
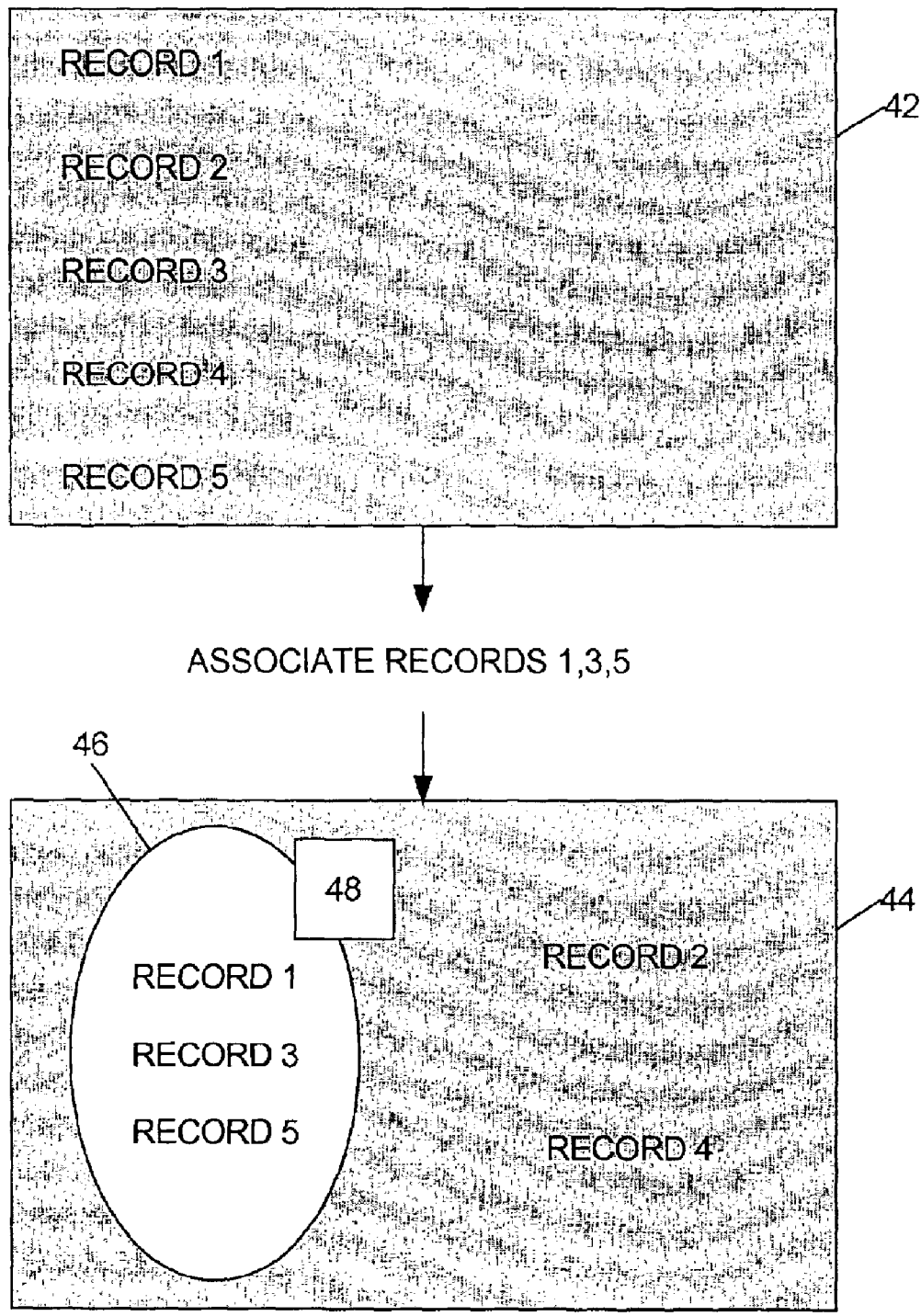
FIG. 3 is a schematic representation of an exemplary associate record set function.

FIG. 3 is a pictorial diagram illustrating the associate records function of FIG. 2. Before the associate records function is executed, a plurality of records can be stored within a database table 42. After execution of the associate records function, a set of related records 46 can exist within the modified database table 44. Each record of set 46, specifically records 1, 3, and 5, can correspond to identifier 48. As mentioned, the association can be implemented using a variety of mechanisms including but not limited to using a specialized data field having an identifier specified on a per set basis and using a maintenance table. In any case, once a set is specified, additional members can be added as additional related records are received and identified by the RDBMS.

Another embodiment of the invention can include specifying subsets of a set if necessary. In that case, the client database can include suitable logic for specifying subsets or can allow the user to specify such relations. For example, a user can specify multiple sets of travel reservation wherein a first contingency can determine which subset of a set can be selected and a second contingency can determine the particular member of a subset to be selected. In illustration, a user can specify a series 5 of travel plans, each to occur over a particular weekend as a set. Based upon a business contingency, travel to New York or Miami may be required. Thus, multiple reservations to New York can be specified as a first subset and multiple reservation to Miami can be specified as a second subset.

Figure 4:
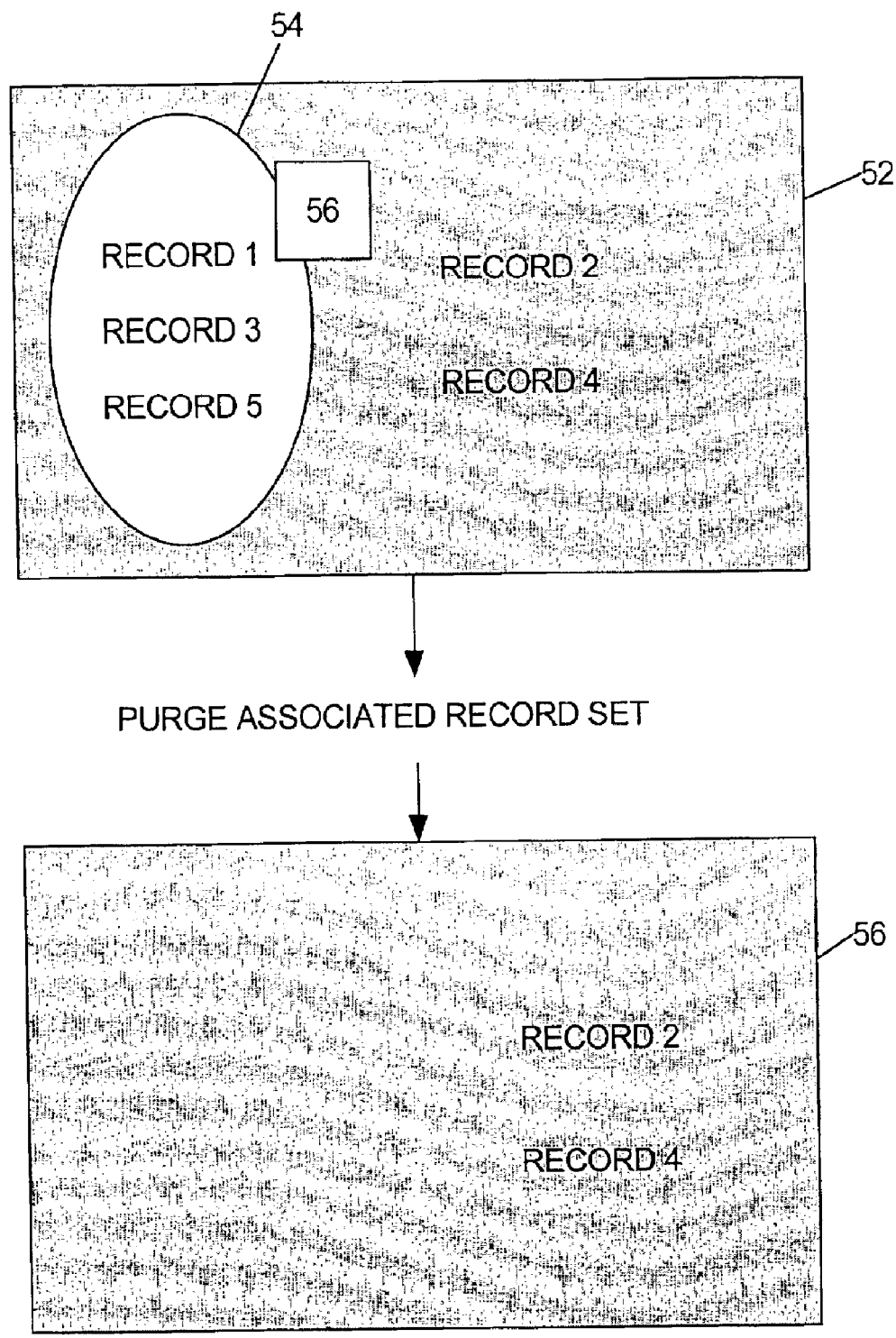
FIG. 4 is a schematic representation of an exemplary purge associated record set function.

FIG. 4 is a pictorial diagram illustrating the purge associated set function of FIG. 2. Before the purge associated set function is executed, a plurality of records stored within a database table 52 can be associated with one another using identifier 56. After execution of the purge associated set function 28, records 1, 3, and 5 have been deleted from modified database table 56. Still, all records of a set need not be purged. For example, if record 3 was selected, then only records 1 and 5 need be deleted. In that case, record 3 can remain in modified table 56 and identifier 56 can be released for use with another set as needed. As mentioned, the purge associated set function can purge records in other tables linked to purged records 1 and 5 using database referential integrity rules. If multiple records such as records 1 and 5 are selected, only record 3 need be deleted.

Figure 5:
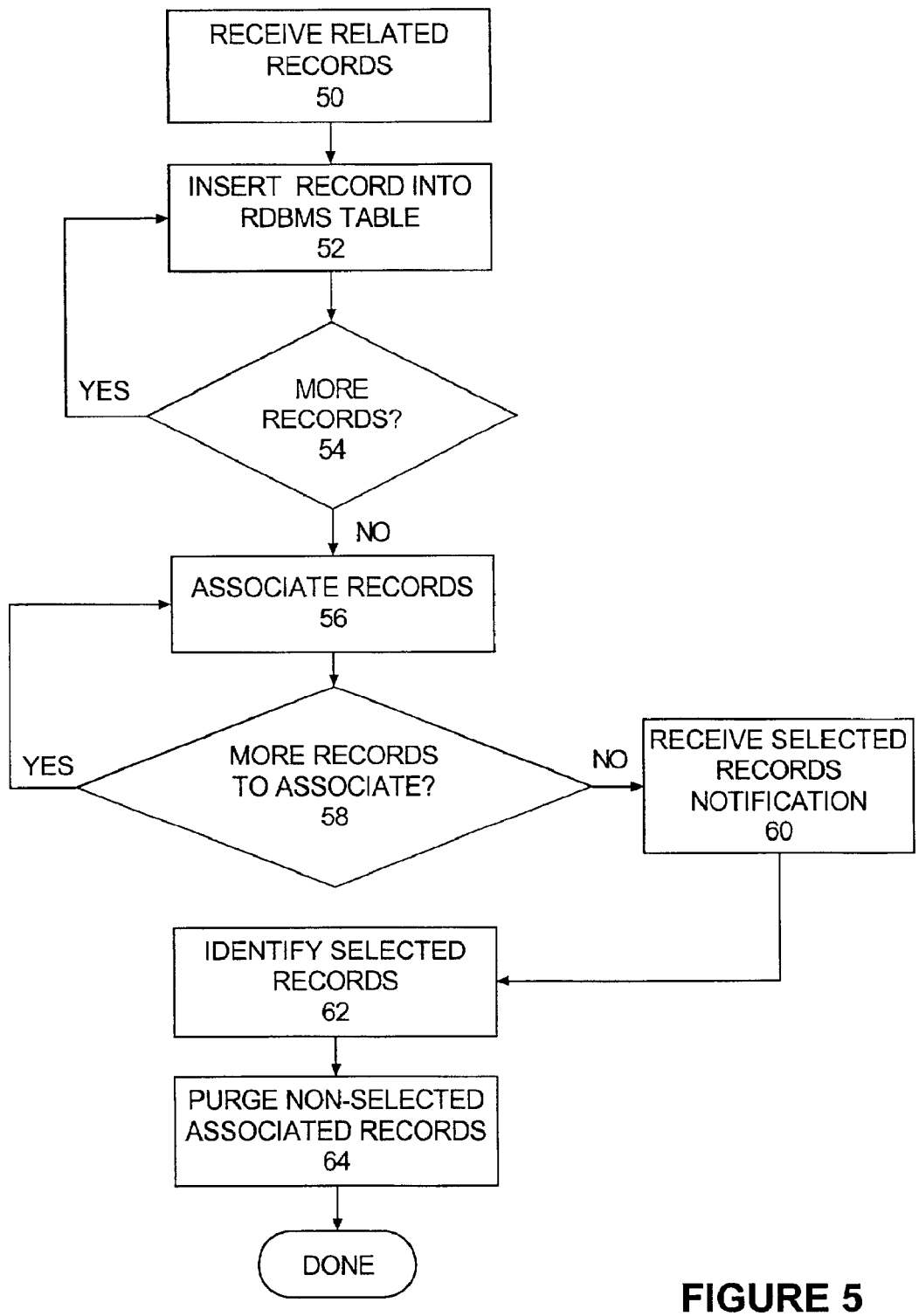
FIG. 5 is a flow chart illustrating an exemplary method of processing related intractable records.

FIG. 5 is a flow chart illustrating an exemplary process for associating a set of records within a single table of an RDBMS as performed by the intra-table record set processor 18 of FIG. 2. The method can begin in a state wherein an RDBMS having an RDBMS table has been configured in accordance with the inventive arrangements disclosed herein and is communicatively linked to a front-end system or application program. Accordingly, the method can begin in step 50 where one or more related records can be received from the front-end system. For example, one or more related records can be received from a reservation system or other user interface. Notably, the records can be identified as related by the user through the user interface or by the front-end system using suitable business logic. In any case, continuing to step 52, once received, the records can be inserted into an RDBMS table.

In step 54, a determination can be made as to whether additional related records have been received. If so, the method can return to step 52 to insert the additional records into the RDBMS table. If not, the method can continue to step 56. In step 56, the received related records can be associated within the single RDBMS table. As mentioned, the related records can be identified as belonging to a set using a particular data type and an identifier conforming to the data type. Notably, the identifier can be common to each member of the set and unique as related to different sets of related records. After completion of step 56, the method can continue to step 58.

In step 58, a determination can be made as to whether any other records exist which can be associated with a particular set. If so, the method can loop back to step 56. If not, the method can continue to step 60. In step 60, a notification such as an event or message can be received indicating that one or more of the related and associated records has been selected. For example, using the front-end system, a user can select or confirm one of the related records. Taking the previous example, a user can confirm one of a plurality of alternate flight reservations through a reservation Web site. Alternatively, the front-end system can determine a selected record using appropriate business logic. For example, the front-end system can select or confirm a reservation when a passenger boards a flight or checks into a hotel. Regardless of how a record is selected, the notification can be received from the front-end system. After completion of step 60, the method can continue to step 62.

In step 62, the selected records can be identified. For example, the records indicated by the notification received in step 60 can be identified within the particular set of associated records. In step 64, the non-selected records of the set of records can be purged from the RDBMS table. As mentioned, any related and linked records existing elsewhere within the RDBMS also can be purged.

The method can be repeated as necessary. Further, it should be appreciated that one or more related records can be received in step 50 and associated in step 56. For example, the method can be performed such that a single record can be received and then processed before receiving a subsequent record. Alternatively, multiple records can be received and processed in a parallel fashion. Still, multiple records can be received through multiple iterations of steps 52 and 54 and then associated through multiple iterations of steps 56 and 58.

As mentioned, one or more related records can be removed from an associated set of records. The disassociate function can be triggered responsive to a notification specifying particular records to be removed from a set. The notification can be initiated by the front-end system responsive to execution of business logic or responsive to a user request to disassociate one or more records from a set. In any case, database administrators, application programmers, database users, as well as other computer applications such as a database application program or "front-end" system can be provided with access to disassociate function.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. In a relational database management system (RDBMS), a method of processing related records comprising;
   an RDDMS receiving a plurality of related records;
   the RDBMS inserting said plurality of related records into a single table of the RDBMS;
   the RDBMS associating said plurality of related records as a set within said single table using a published function of said RDBMS;
   the RDAMS receiving a triggering event from an application program, wherein the application program specifies one of the related records and a processing action to be performed by the RDBMS against the specified record; and
   responsive to the triggering event, the RDBMS automatically purging non-specified ones of the related records, wherein said published function is accessible to front-end systems, wherein each of said front end systems is configured to identity said plurality of records as a defined set using said published function, and wherein a published function of said RDBMS also permits each of the front end systems to disassociate selected records from said set.

2. The method of claim 1, wherein said purging step purges all related records of said set except for said specified record.

3. The method of claim 1, wherein said purging step purges each one of said plurality of related records.

4. The method of claim 1, wherein said table includes data type for specifying said plurality of related records and said associating step further comprises the RDBMS assigning to each one of said plurality of related records a common identifier conforming with said data type, wherein said common identifier is unique to said set.

5. The method of claim 1, further comprising:
deleting throughout said RDBMS, records linked to said purged records using referential integrity rules.

6. The method of claim 1, said associating step further comprising:
associating selected records of said set as a subset wherein said particular related records of said purging step include at least one selected record of said subset.

7. The method of claim 1, wherein during the associating step, intra-table record associations are recorded within a pre-defined RDBMS table.

8. In a relational database management system (RDBMS), a method of processing related records comprising:
the RDBMS receiving a plurality of records;
the RDFIMS inserting said plurality of records into & single table of the RDBMS;
the RDEMS receiving a user provided indication that particular ones of said plurality of records are related records;
the RDEIMS associating said related records as a set within said single table using a published function of said RDBMS, wherein each one of said related records is assigned a common identifier unique to said set which conforms to a data type in said table for associating said related records; and
responsive to a triggering condition identifying at least one of said related records, the RDBMS selectively purging particular non-identified related records of said set from the single table, wherein said user provided indication is conveyed from a front end system, wherein said published function is accessible to said front-end system, wherein said front end systems is configured to identity said plurality of records as a defined set using said published function, and wherein a published function of said RDBMS also permits said front end system to disassociate selected records from said set.

9. The method of claim 8, wherein during the associating step, intra-table record associations are recorded within a pre-defined RDBMS table.

10. A machine-readable storage, having stored thereon a computer program having a plurality of code sections executable by a machine for causing the machine to perform the steps of:
receiving a plurality of related records:
inserting said plurality of related records into a single table of an RDBMS;
associating said plurality of related records as a set within said single table using a published function of said RDBMS; and
receiving a triggering event from an application program, wherein the application program specifies one of the related records and a processing action to be performed by the RDBMS against the specified record;
responsive to the triggering event, the RDBMS automatically purging non-specified ones of the related records, wherein said published function is accessible to front-end systems, wherein each of said front end systems is configured to identity said plurality of records as a defined set using said published function, and wherein a published function of said RDBMS also permits each of the front end systems to disassociate selected records from said set.

11. The machine-readable storage of claim 10, wherein said purging step purges all related records of said set except for said specified record.

12. The machine-readable storage of claim 10, wherein said purging step purges each one of said plurality of related records.

13. The machine-readable storage of claim 10, wherein said table includes a data type for specifying said plurality of related records and said associating step further comprises assigning to each one of said plurality of related records a common identifier conforming with said data type, wherein said common identifier is unique to said set.

14. The machine-readable storage of claim 10, further comprising:
deleting throughout said RDBMS, records linked to said purged records using referential integrity rules.

15. The machine-readable storage of claim 10, said associating step further comprising:
associating selected records of said set as a subset wherein said particular related records of said purging step include at least one selected record of said subset.

16. A machine readable storage, having stored thereon a computer program having a plurality of code sections executable by a machine for causing the machine to perform the steps of
receiving a plurality of records;
inserting said plurality of records into a single table of an RDHMS;
the RDBMS receiving a user provided indication that particular ones of said plurality of records are related records;
the RDBMS associating said related records as a set within said single table using a published function of said RDBMS, wherein each one of said related records is assigned a common identifier unique to said set which conforms to a data type in said table for associating said related records; and
responsive to a triggering condition identifying at least one of said related records, the RDBMS selectively purging particular non-identified related records of said set from the single table, wherein said user provided indication is conveyed from a front end system, wherein said published function is accessible to said front-end system, wherein said front end systems is configured to identity said plurality of records as a defined set using said published function, and wherein a published function of said RDBMS also permits said front end system to disassociate selected records from said set.

* * * * *